United States Patent
Nakao et al.

(10) Patent No.: US 8,749,210 B1
(45) Date of Patent: Jun. 10, 2014

(54) POWER SUPPLY DEVICE (71) Applicant: Fujitsu Limited, Kawasaki (JP)

(72) Inventors: Hiroshi Nakao, Yamato (JP); Yu Yonezawa, Sagamihara (JP); Yoshiyasu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/065,799

(22) Filed: Oct. 29, 2013

(30) Foreign Application Priority Data

Dec. 19, 2012 (JP) ................................. 2012-277231

(51) Int. Cl.
*H02M 3/158* (2006.01)
*H02M 3/156* (2006.01)

(52) U.S. Cl.
USPC ........... 323/225; 323/224; 323/271; 323/282; 363/65

(58) Field of Classification Search
USPC ................. 323/225, 271, 272, 282–285, 351; 363/65–70
See application file for complete search history.

(56) References Cited

U.S. PATENT DOCUMENTS

| 7,898,238 | B2 * | 3/2011 | Wiedemuth et al. | 323/351 |
| 8,199,541 | B2 * | 6/2012 | Yang | 363/89 |
| 8,363,434 | B2 * | 1/2013 | Lin | 363/44 |
| 2005/0105311 | A1 | 5/2005 | Soldano | |

FOREIGN PATENT DOCUMENTS

| JP | 2007-527687 | 9/2007 |
| JP | 2011-152017 | 8/2011 |

* cited by examiner

*Primary Examiner* — Jessica Han
(74) *Attorney, Agent, or Firm* — Staas & Halsey LLP (57) ABSTRACT

A power supply device includes: a first serial circuit coupled between a first output terminal and a second output terminal, and including a first switching element and a first rectification element; a second serial circuit coupled between the first output terminal and the second output terminal, and including a second switching element and a second rectification element; a third switching element inserted between a connection point between a first inductor and a first input terminal, and a second output terminal; a fourth switching element inserted between a connection point between a second inductor and a second input terminal, and the second output terminal; a control circuit configured to control the first and second switching elements; and a synchronous rectification control circuit configured to control the third and fourth switching elements.

8 Claims, 10 Drawing Sheets

POWER SUPPLY DEVICE

CROSS-REFERENCE TO RELATED APPLICATION

This application is based upon and claims the benefit of priority from the prior Japanese Patent Application No. 2012-277231 filed on Dec. 19, 2012, the entire contents of which are incorporated herein by reference.

FIELD

The embodiments discussed herein are related to a power supply device.

BACKGROUND

Savings on energy resources in various fields have attracted public attention in recent years, and as a result, an influence thereof has spread into many areas including, for example, a field of a power supply. Specifically, for example, there has been a demand for a switching power supply device to be even more efficient.

A power factor correction (PFC) converter that corrects the power factor of the switching power supply device includes a diode bridge that inputs common AC power and performs a full-wave rectification of the input AC power and a step-up chopper circuit that inputs the full-wave rectified voltage. In order to reduce power loss in a diode bridge circuit, there is also a switching power supply device serving as a bridgeless PFC without a rectifying bridge circuit.

Figure 1:
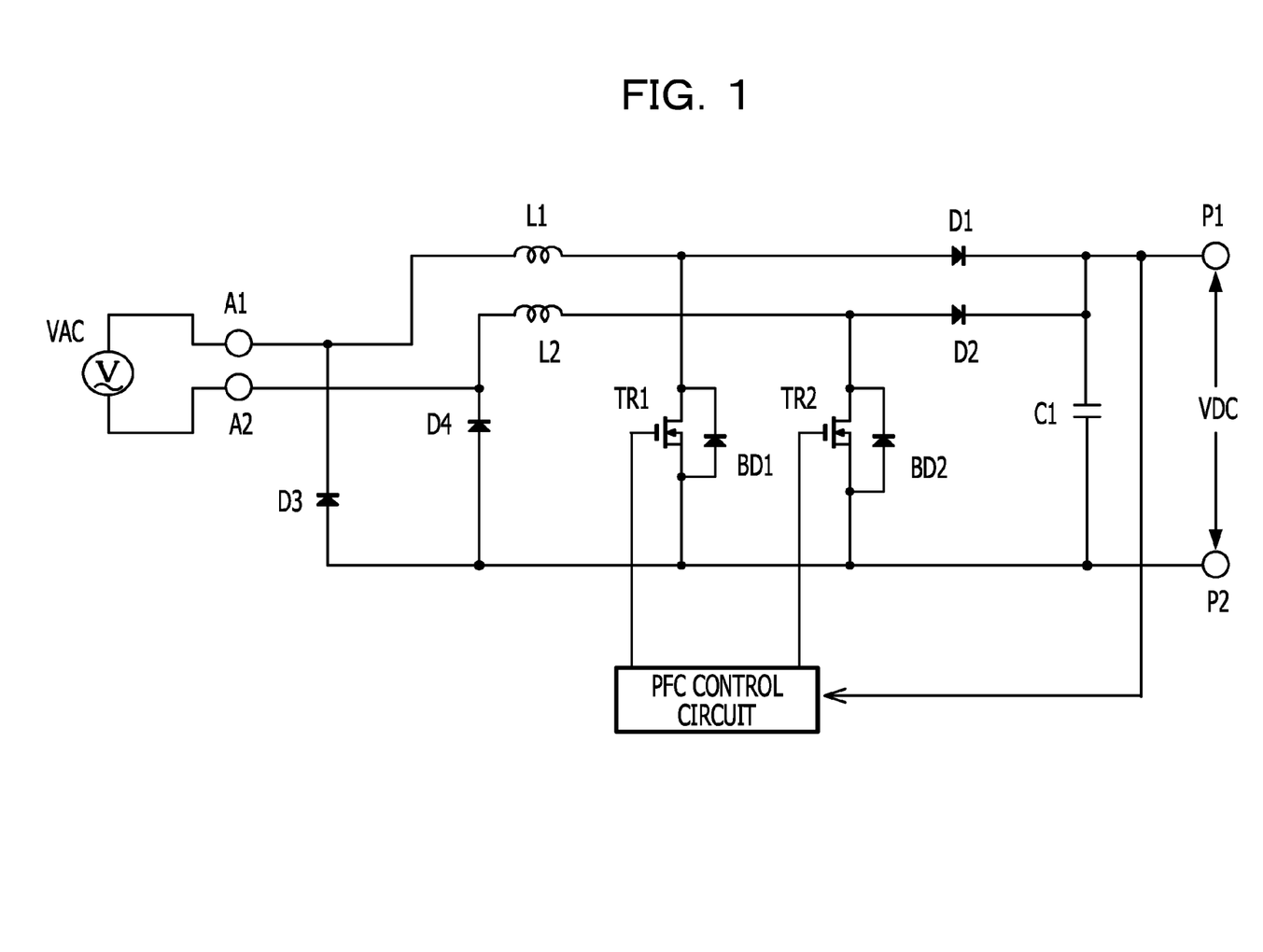
FIG. 1 is a circuit diagram illustrating one example of a power supply device having a bridgeless PFC circuit.

FIG. 1 illustrates one example of a circuit diagram of a switching power supply device with a bridgeless PFC circuit. In the switching power supply device illustrated in FIG. 1, the common AC power is connected to a first input terminal A1 and a second input terminal A2, and AC input voltage VAC is input. A diode bridge that performs a full-wave rectification of the AC input voltage VAC is not provided in an input terminal of the switching power supply device.

A first serial circuit including a first switching element TR1 and a first diode D1 is connected to two output terminals P1 and P2 in parallel. Also, a second serial circuit including a second switching element TR2 and a second diode D2 is connected to two output terminals P1 and P2 in parallel. For example, a metal oxide semiconductor field effect transistor (MOSFET) may be used as a switching element.

A smoothing circuit by a condenser C1 that smoothes a DC output is connected to two output terminals P1 and P2 in parallel.

A first PFC circuit is constituted by a first inductor L1, the first switching element TR1, the first diode D1, and the condenser C1, which are connected in a T shape, and when the AC input voltage VAC is a plus cycle, the first PFC circuit serves as an active filter circuit that corrects the power factor of the power by reducing the distortion of a harmonic included in AC input current.

A second PFC circuit is constituted by a second inductor L2, a second switching element TR2, a second diode D2, and the condenser C1, which are connected in the T shape, and when the AC input voltage VAC is a minus cycle, the second PFC circuit serves as the active filter circuit that corrects the power factor of the power by reducing the distortion of the harmonic included in the AC input current.

The first inductor L1 is inserted between a connection point between the first switching element TR1 and the first diode D1, and the first input terminal A1 of the AC input power. The second inductor L2 is inserted between a connection point between the second switching element TR2 and the second diode D2, and the second input terminal A2 of the AC input power.

A first return diode D3 is inserted between a connection point between the first input terminal A1 and the first inductor L1, and a line of the output terminal P2. A second return diode D4 is inserted between a connection point between the second input terminal A2 and the second inductor L2, and a line of the output terminal P2.

Figure 2A:
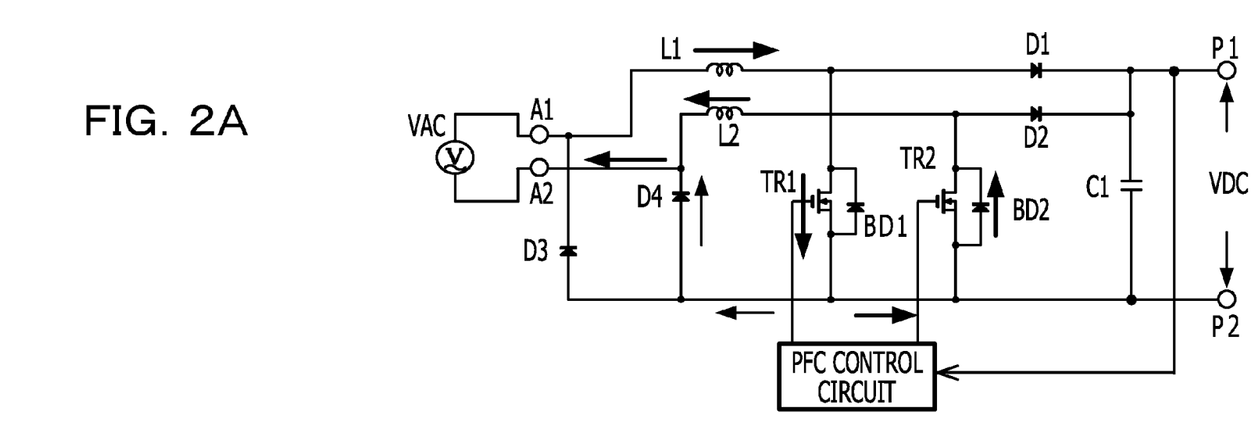
FIGS. 2A and 2B are circuit diagrams explaining an operation of the bridgeless PFC circuit, respectively.
Figure 2B:
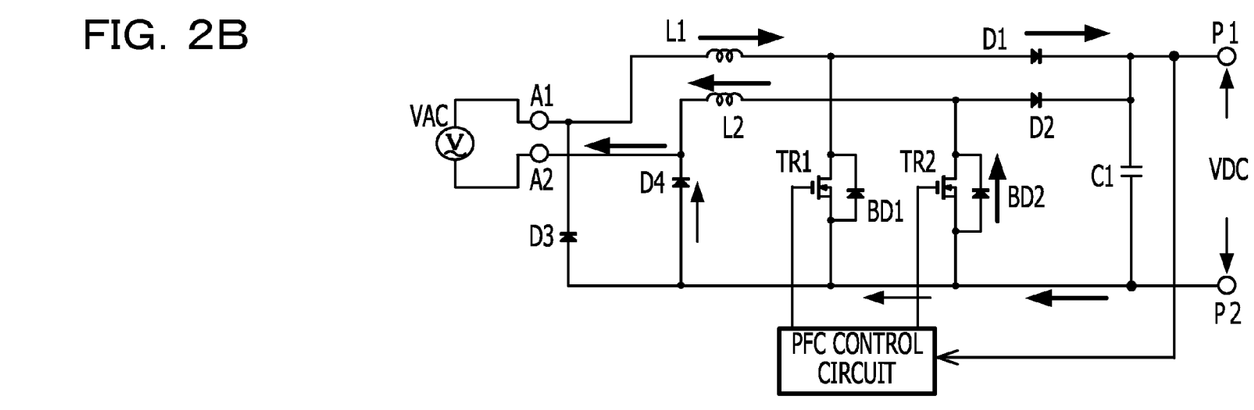

FIGS. 2A and 2B are diagrams illustrating a current path of the switching power supply device illustrated in FIG. 1 when the AC input voltage VAC is a plus half-cycle. In the plus half-cycle, the PFC is controlled by turning ON and OFF the first switching element TR1. At that time, the second switching element TR2 is also turned ON and OFF simultaneously.

FIG. 2A illustrates a current path when the first switching element TR1 is turned ON and FIG. 2B illustrates a current path when the first switching element TR1 is turned OFF.

Referring to FIG. 2A, when the first switching element TR1 is turned ON, current that flows from the first input terminal A1 to the first inductor L1 flows from the first switching element TR1 to the line of the output terminal P2. While the current that flows to the line of the output terminal P2 returns to the second input terminal A2 through the return diode D4, the second switching element TR2 which is a MOSFET is also turned ON, and as a result, the voltage drop of the second switching element TR2 is smaller than voltage drop in the return diode D4. Thus, most of the return current flows to the second switching element TR2 and a small amount of current flows to the return diode D4.

Referring to FIG. 2B, when the first switching element TR1 is turned OFF, the current that flows from the first input terminal A1 to the first inductor L1 flows to the output terminal P1 not through the first switching element TR1 but through the first diode D1. The return current from the output terminal P2 returns to the second input terminal A2 through the return diode D4. The return current returns to the second input terminal A2 even through a parasitic diode ("a body diode") BD2 of the second switching element TR2 and the second inductor L2.

Since the inductor has a property to allow current to continuously flow, the second inductor L2 allows the return current to continuously flow as it is even though the first switching element TR1 is switched to an OFF state from an ON state. Therefore, the return current continuously flows to the body diode BD2 of the second switching element TR2 as well.

The current does not flow on the return diode D4 once at the time when the first switching element TR1 is switched to the OFF state from the ON state and thereafter, the current slowly flows out. However, since the voltage drop of the body diode BD2 is smaller than that of the return diode D4, most of the return current flows to the body diode BD2 of the second switching element TR2 which is turned OFF and only a small amount of current flows to the return diode D4.

Power tends to be lost while the return current flows on the body diode BD2. Therefore, in order to further improve an output efficiency of the switching power supply device, the return current that flows to the body diode BD2 needs to decrease.

It may be considered that a high electron mobility transistor (GaN-HEMT) without a body diode is used as the first and second switching elements TR1 and TR2 in order to reduce loss in the body diode. However, in this case, a total of the return current flows to the return diode, and as a result, loss is generated in the return diode. The loss in the return diode becomes even larger than that of the body diode.

The following is reference documents:
[Document 1] Japanese Patent Application Laid-Open No. 2011-152017 and
[Document 2] Japanese Unexamined Patent Application Publication No. 2007-527687.

SUMMARY

According to an aspect of the invention, a power supply device, includes: a first serial circuit coupled between a first output terminal and a second output terminal, and including a first switching element and a first rectification element; a second serial circuit coupled between the first output terminal and the second output terminal, and including a second switching element and a second rectification element; a first inductor inserted between a connection point between the first switching element and the first rectification element, and a first input terminal of an AC input; a second inductor inserted between a connection point between the second switching element and the second rectification element, and a second input terminal of the AC input; a third switching element inserted between a connection point between the first inductor and the first input terminal, and the second output terminal; a fourth switching element inserted between a connection point between the second inductor and the second input terminal, and the second output terminal; a control circuit configured to control the first and second switching elements; and a synchronous rectification control circuit configured to control the third and fourth switching elements.

The object and advantages of the disclosure will be realized and attained by means of the elements and combinations particularly pointed out in the claims.

It is to be understood that both the foregoing general description and the following detailed description are exemplary and explanatory and are not restrictive of the disclosure, as claimed.

DESCRIPTION OF EMBODIMENTS

Figure 3A:
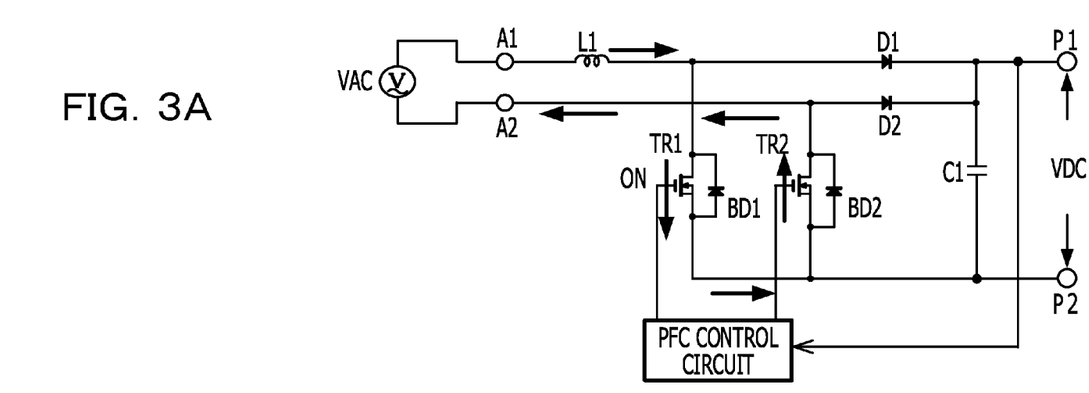
FIGS. 3A and 3B are circuit diagrams describing an operation of a power supply device of a comparative example, respectively.
Figure 3B:
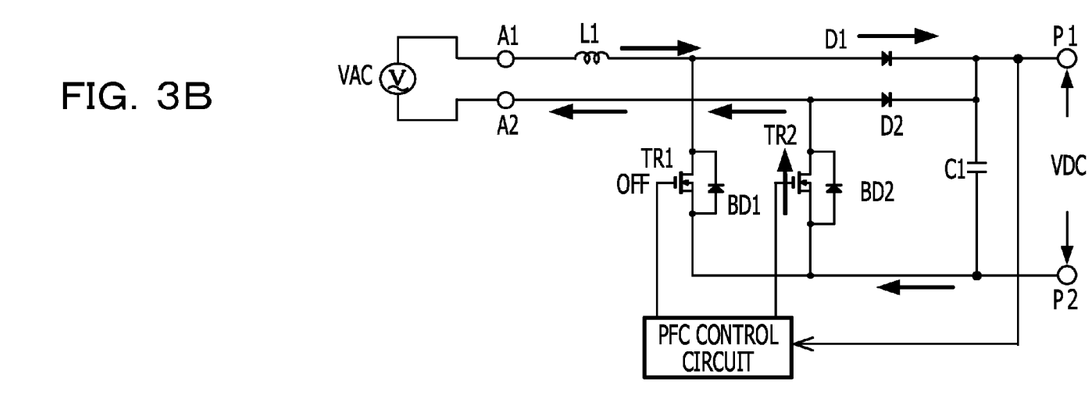

Referring to FIGS. 3A and 3B, a comparative example of a switching power supply device having a bridgeless PFC circuit that reduces loss in a body diode will be described first.

In FIGS. 3A and 3B, the same reference numerals refer to the same or equivalent components of the switching power supply device illustrated in FIG. 1 and the descriptions thereof will be omitted.

The switching power supply device of the comparative example has no diode corresponding to the return diodes D3 and D4 which are provided in the switching power supply device illustrated in FIG. 1.

FIGS. 3A and 3B are diagrams illustrating a current path when AC input voltage VAC is a plus half cycle. In the plus half cycle, a PFC is controlled by switching a first switching element TR1, and a second switching element TR2 is turned ON.

FIG. 3A illustrates a current path when the first switching element TR1 is turned ON and FIG. 3B illustrates a current path when the first switching element TR1 is turned OFF.

Referring to FIG. 3A, when the first switching element TR1 is turned ON, current that flows from a first input terminal A1 to a first inductor L1 flows from the first switching element TR1 to a line of an output terminal P2. The current that flows to the line of the output terminal P2 returns to a second input terminal A2 from a second switching element TR2 which is turned ON.

Referring to FIG. 3B, when the first switching element TR1 is turned OFF, the current that flows from the first input terminal A1 to the first inductor L1 flows to an output terminal P1 not through the first switching element TR1 but through a first diode D1. The return current that flows from the output terminal P2 returns to a second input terminal A2 from a second switching element TR2 which is turned ON.

In the switching power supply device of the comparative example, the second switching element TR2 is turned ON, and as a result, a return diode is not required and the loss in a body diode is removed. However, since the second switching element TR2 is turned ON during a half cycle of the AC input voltage VAC, power is lost by ON-resistance in the meantime.

Power consumption occurs in a switching transistor due to, for example, a resistance component between a source and a drain when a transistor is turned ON, called the ON-resistance of the transistor, and an excessive state that occurs when the transistor is switched between the ON/OFF state, so called a switching loss.

The problem caused due to the ON-resistance of the transistor occurs when the transistor is turned ON. That is, the ON-resistance of the transistor generates voltage between terminals in which the current of the transistor flows by the ON-resistance and the current by the law of ohm when the current flows to the transistor while the transistor is turned ON.

Since the power consumed in the transistor is a product of the flow that flows on the transistor and voltage generated between both terminals in which current flows on the transistor, the power may not be extracted as an output of switching power and is converted into heat in the transistor to become power loss.

The loss generated in an excessive state of ON and OFF, called the switching loss, is generated because there exists the time when both current and voltage are not zero, called a switching time, at the time of switching between the ON/OFF state. When variations of the current and voltage in the excessive state are set as approximately a work function of a time, the switching loss may be expressed by current×voltage× switching time/2, and as a result, a drive capability of the transistor needs to increase, that is, a switching speed needs to increase in order to reduce the switching loss.

Figure 4:
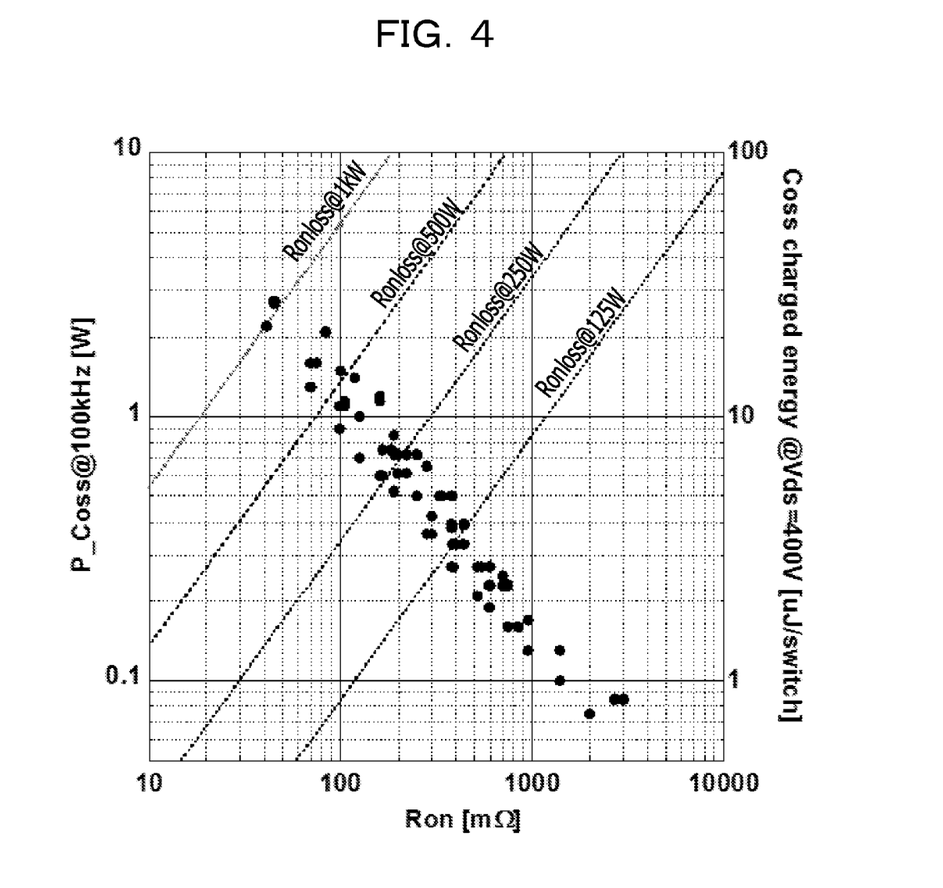
FIG. 4 is a diagram describing the relationship between on-resistance and switching loss of a MOSFET.

FIG. 4 is a diagram plotting the relationship between ON-resistance of a silicon MOSFET which comes into market and switching loss by output capacitance. A dotted line indicates a loss by ON-resistance in a specific output. Based on FIG. 4, it may be seen that a MOSFET having low ON-resistance has a large switching loss and a MOSFET having small switching loss has a large ON-resistance.

In the PFC control, since the switching is performed at a comparatively rapid cycle of 100 KHz to 200 KHz, a MOSFET which has a rapid switching and small switching loss may be used as the switching element.

Since a switch for returning the return current is turned ON during a half period of a cycle (e.g., 50 Hz to 60 Hz) of the AC input voltage VAC, a MOSFET having a small ON-resistance may be used in order to reduce the loss converted to heat generated in the meantime.

As is known in FIG. 4, however, it is difficult to select a MOSFET which has both small switching loss and ON-resistance. In the switching power supply device of the comparative example, there is a problem that any one of the switching loss and the loss by the ON-resistance increases. That is, when the switching and the current return for the PFC control are performed by the same switching element, the power loss increases.

Hereinafter, an embodiment suitable for the disclosed technology will be described in detail with reference to the drawings.

Figure 5:
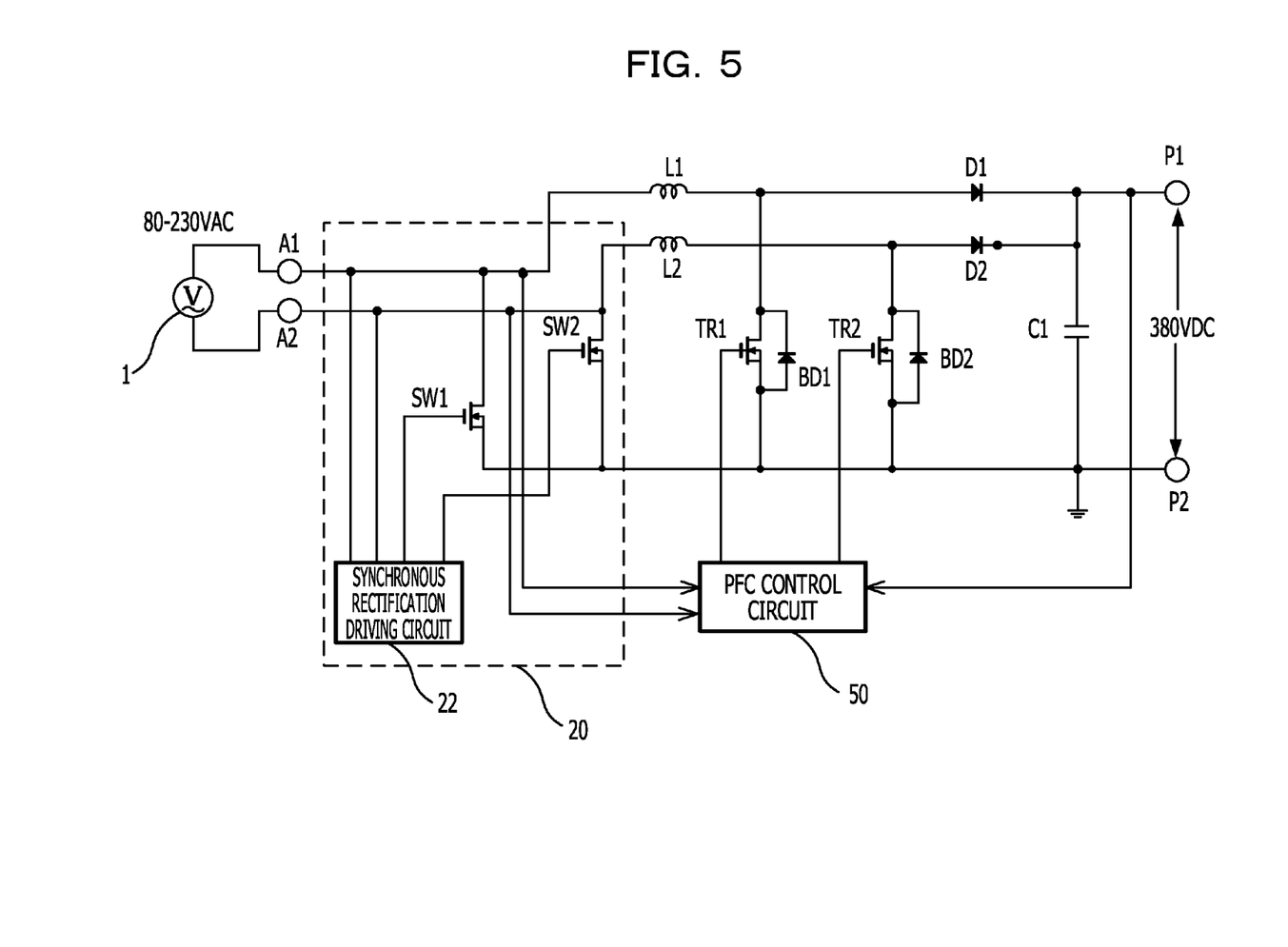
FIG. 5 is a circuit diagram of a power supply device of the present embodiment.

FIG. 5 is a circuit diagram illustrating the switching power supply device of an embodiment according to the disclosed technology. In FIG. 5, the same reference numerals refer to the same or equivalent components of the switching power supply device illustrated in FIG. 1 and descriptions thereof will be omitted.

The switching power supply device of the embodiment includes input terminals A1 and A2, a PFC circuit, a PFC control circuit 50, output terminals P1 and P2, and a synchronous rectification control circuit 20.

Common AC power (e.g., 80 VAC to 230 VAC) is input into the input terminals A1 and A2 from an AC power supply 1.

The output terminal P1 is a plus pole terminal that outputs DC power, and the output terminal P2 is a minus pole terminal that outputs the DC power.

A first serial circuit including the first switching element TR1 and the first diode D1 is connected to two output terminals P1 and P2 in parallel. Also, a second serial circuit including the second switching element TR2 and the second diode D2 is connected to two output terminals P1 and P2 in parallel. For example, a MOSFET having a high switching speed and thus having a small switching loss may be used as the first and second switching elements. A gallium nitride—high electron mobility transistor (GaN—HEMT) using gallium nitride (GaN), which has a high switching speed and may be resistant to the high internal pressure may be used as the first and second switching elements.

The first inductor L1 is inserted between a connection point between the first switching element TR1 and the first diode D1, and the input terminal A1. The second inductor L2 is inserted between a connection point between the second switching element TR2 and the second diode D2, and the input terminal A2. For example, a step-up inductor is used as the first and second inductors L1 and L2.

A smoothing condenser C1 that smoothes a DC output is connected to two output terminals P1 and P2 in parallel.

A first PFC circuit is constituted by the first inductor L1, the first switching element TR1, the first diode D1, and the smoothing condenser C1 which are connected in a T shape. A second PFC circuit is constituted by the second inductor L2, the second switching element TR2, the second diode D2, and the smoothing condenser C1 which are connected in the T shape.

The first switching element TR1 and the second switching element TR2 receive pulse type gate voltage to the gates from the PFC control circuit 50 to be turned OFF and ON, and driven with pulse width modulation (PWM).

The PFC control circuit 50 outputs the pulse-type gate voltage applied to the gates of the first and second switching elements TR1 and TR2. The PFC control circuit 50 determines a voltage value of AC power input from the input terminals A1 and A2, a current value of current that flows on the first and second switching elements TR1 and TR2, and a duty ratio of gate voltage based on a voltage value at an output side of the smoothing condenser C1 to apply the gate voltage to the gates of the first and second switching elements TR1 and TR2. As the PFC control circuit 50, for example, a multiplier circuit may be used, which may calculate the duty ratio based on the current value that flows on the first and second switching elements TR1 and TR2, the DC output voltage value, and the AC input voltage value.

A first PFC circuit serves as an active filter circuit that corrects a power factor of the power by reducing the distortion of a harmonic included in the AC input current when the AC input voltage VAC is in a plus cycle. A second PFC circuit serves as an active filter circuit that corrects the power factor of the power by reducing the distortion of the harmonic included in the AC input current when the AC input voltage VAC is in a minus cycle.

The first and second diodes D1 and D2 may have a rectification direction which is the direction of the smoothing condenser C1 from the first and second inductors L1 and L2 and for example, a first recovery diode and a SiC Schottky diode are used.

A first synchronous rectification switch SW1 is inserted between a connection point between the input terminal A1 and the first inductor L1, and a line of the output terminal P2. A second synchronous rectification switch SW2 is inserted between a connection point between the input terminal A2 and the second inductor L2, and the line of the output terminal P2. For example, a MOSFET having small ON-resistance may be used as the first and second synchronous rectification switches SW1 and SW2. Alternatively, a GaN-HEMT having a small ON-resistance may be used.

The ON/OFF switching of the first and second synchronous rectification switches SW1 and SW2 are controlled by a synchronous rectification driving circuit 22. The first and second synchronous rectification switches SW1 and SW2 and the synchronous rectification driving circuit 22 constitute the synchronous rectification control circuit 20.

The operation of the switching power supply device of the embodiment will be described by referring to FIGS. 6A and 6B next.

Figure 6A:
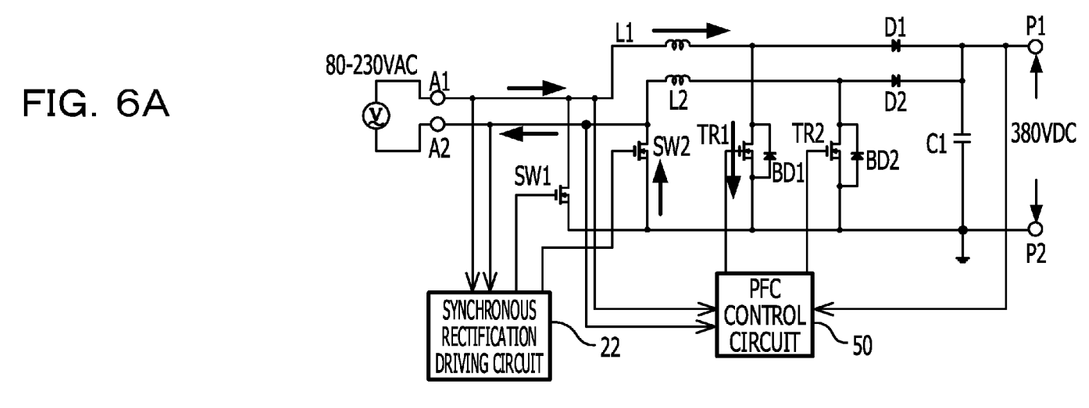
FIGS. 6A and 6B are circuit diagrams describing an operation of the power supply device of the present embodiment, respectively.
Figure 6B:
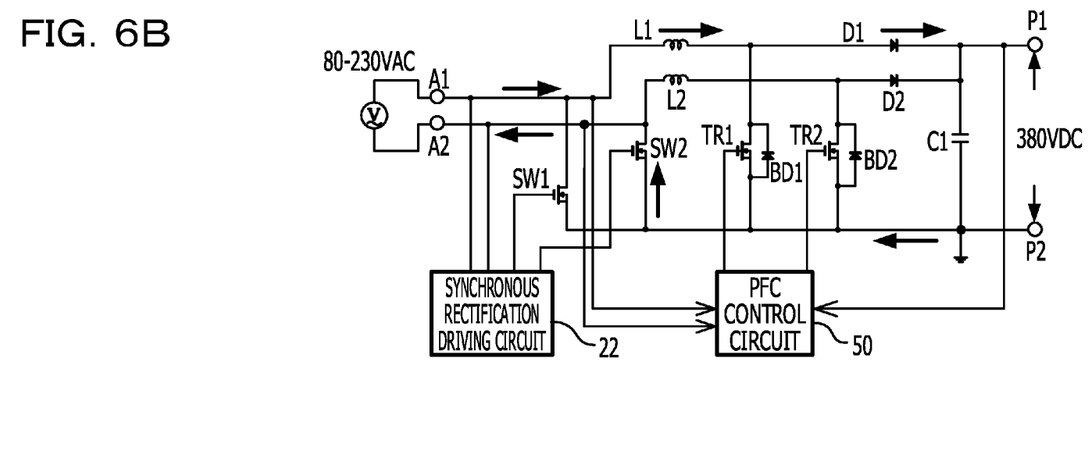

FIGS. 6A and 6B are diagrams illustrating a current path of the switching power supply device illustrated in FIG. 5 when the AC input voltage VAC is in a plus half-cycle. In the plus half-cycle, the PFC is controlled by turning ON and OFF the first switching element TR1. At that time, the second switching element TR2 is turned OFF.

FIG. 6A illustrates a current path when the first switching element TR1 is turned ON and FIG. 6B illustrates a current path when the first switching element TR1 is turned OFF.

Referring to FIG. 6A, when the first switching element TR1 is turned ON, current that flows from the input terminal A1 to the first inductor L1 flows from the first switching element TR1 to the line of the output terminal P2. The synchronous rectification driving circuit 22 detects that the AC input voltage VAC is in the plus cycle to turn ON the second synchronous rectification switch SW2.

The current that flows to the line of the output terminal P2 returns to the second input terminal A2 through the second synchronous rectification switch SW2. Since the voltage drop in the second synchronous rectification switch SW2 is still smaller than that of the body diode BD2 of the second switching element TR2, the return current does not flows on the body diode BD2 but flows on the second synchronous rectification switch SW2.

Referring to FIG. 6B, when the first switching element TR1 is turned OFF, the current that flows from the input terminal A1 to the first inductor L1 flows to the output terminal P1 not through the first switching element TR1 but through the first diode D1. The return current from the output terminal P2 returns to the second input terminal A2 through the second synchronous rectification switch SW2. Since the voltage drop in the second synchronous rectification switch SW2 is still smaller than that of the body diode BD2 of the second switching element TR2, the return current does not flows on the body diode BD2 but flows on the second synchronous rectification switch SW2.

A period when the second synchronous rectification switch SW2 is turned ON is a period which is a half of the cycle (e.g., 50 Hz to 60 Hz) of the AC input voltage VAC. When the MOSFET having a small ON-resistance is used as the second synchronous rectification switch SW2, the loss converted into heat during the period when the second synchronous rectification switch SW2 is turned ON may be reduced.

According to the embodiment, since the return current does not flow on the body diode of the switching element which is turned OFF, power is not lost in the body diode, and since the loss by the ON-resistance in the synchronous rectification switch may be reduced, a switch power supply device having a high power efficiency may be provided.

An example of the synchronous rectification driving circuit 22 of the embodiment will be described next by referring to FIGS. 7 and 8.

Figure 7:
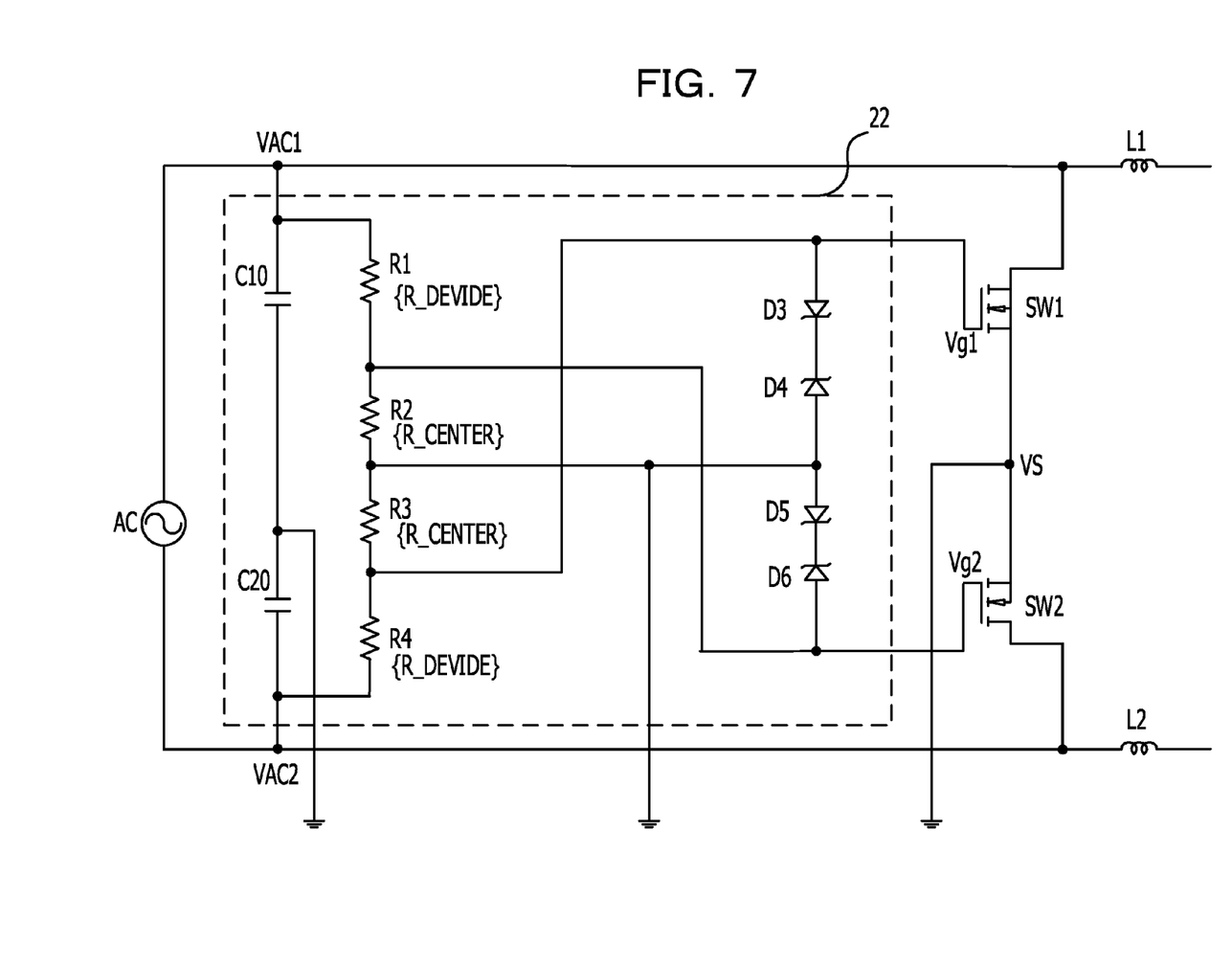
FIG. 7 is a circuit diagram illustrating an example of a synchronous rectification driving circuit.

FIG. 7 is an exemplary circuit of the synchronous rectification driving circuit 22 for synchronizing gates of the first and second synchronous rectification switches SW1 and SW2 with the AC input voltage VAC and driving the gates. In the embodiment, the gate biases of the synchronous rectification switches SW1 and SW2 are prepared by resistance-dividing of the AC input voltage VAC.

In order to comply with the worldwide voltage of the AC input voltage (e.g., 80 VAC to 230 VAC), the maximum voltage is restricted by Zener diodes D1 to D4 by setting resistance ratios of divisions resistances R1:R2 and R4:R3 to, for example, 2:1.

Figure 8A:
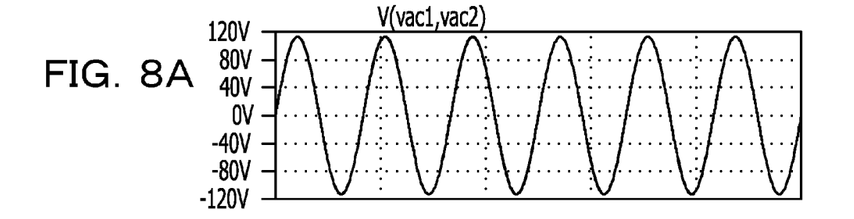
FIGS. 8A to 8E are view illustrating an operation simulation result of the synchronous rectification driving circuit, respectively.
Figure 8B:
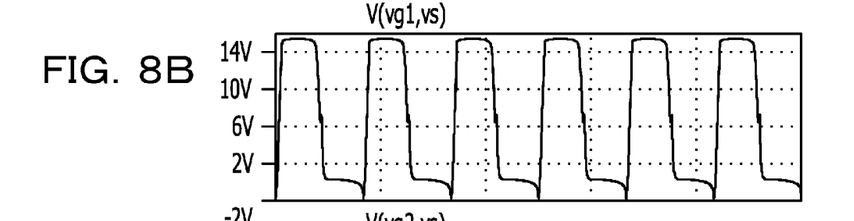
Figure 8C:
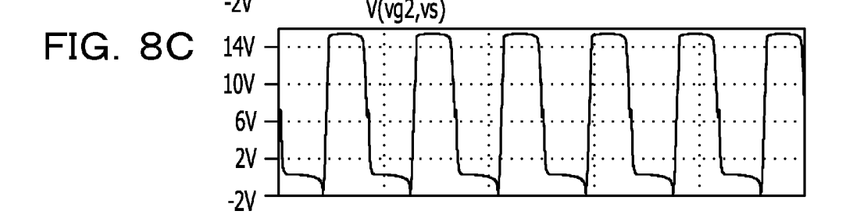
Figure 8D:
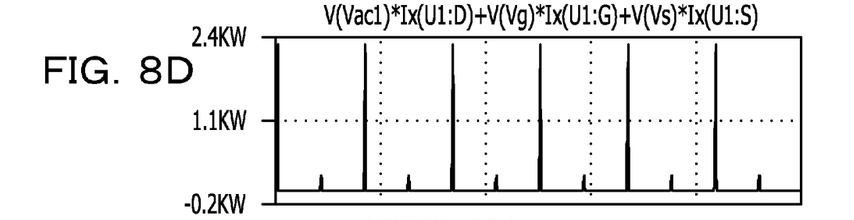
Figure 8E:
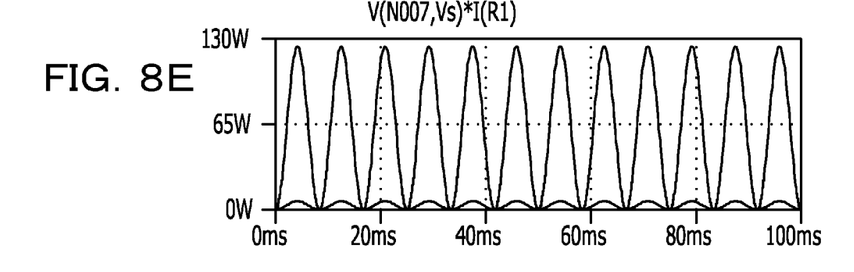

FIGS. 8A to 8E illustrate a simulation waveforms when AC 230V is input in the synchronous rectification driving circuit 22 illustrated in FIG. 7 as the AC input voltage. FIG. 8A illustrates an AC input voltage waveform, FIG. 8B illustrates a gate waveform of the first synchronous rectification switch SW1, FIG. 8C illustrates a gate waveform of the second synchronous rectification switch SW2, FIG. 8D illustrates switching loss, and FIG. 8E illustrates a DC output voltage waveform.

It may be seen from FIGS. 8B and 8C that biases are applied to the gates of the first and second synchronous rectification switches SW1 and SW2 in response to the AC input voltage VAC. In the embodiment, the gate bias is prepared by a resistance dividing circuit, but even if a dedicated auxiliary power supply and a dedicated control circuit are used, the same operation may be achieved.

Figure 9:
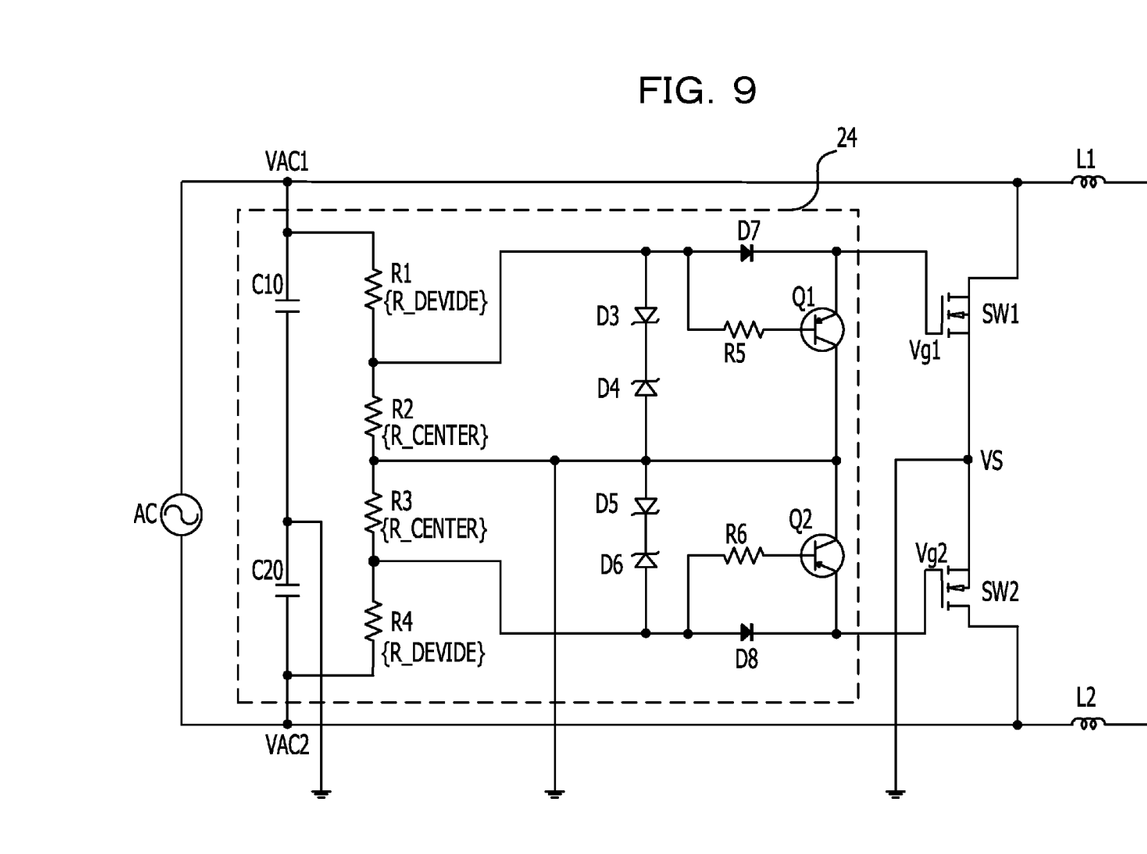
FIG. 9 is a circuit diagram illustrating another example of the synchronous rectification driving circuit.
Figure 10A:
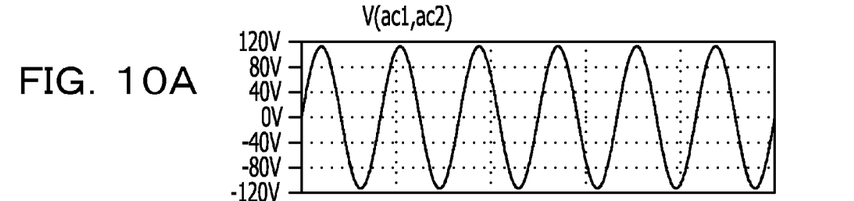
FIGS. 10A to 10E are view illustrating an operation simulation result of the another synchronous rectification driving circuit, respectively.
Figure 10B:
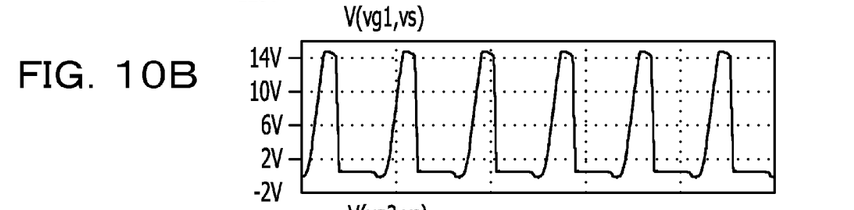
Figure 10C:
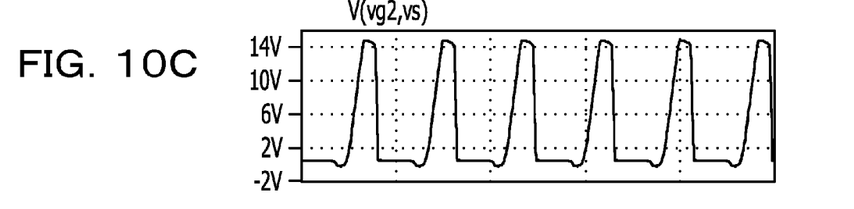
Figure 10D:
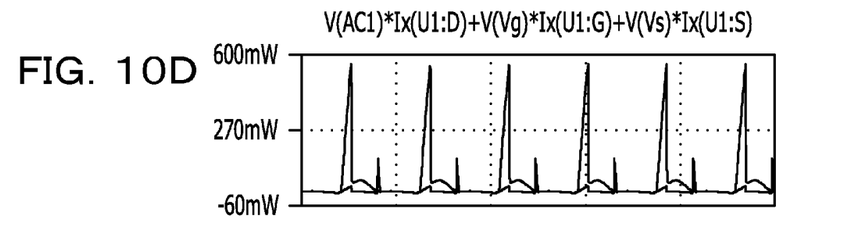
Figure 10E:
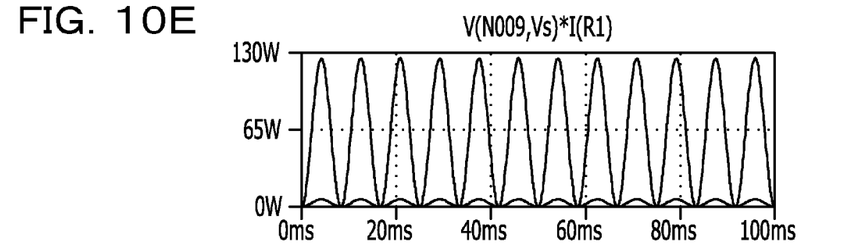

FIG. 9 is an exemplary circuit of a synchronous rectification driving circuit 24 according to another embodiment of the synchronous rectification driving circuit. FIGS. 10A to 10E illustrate simulation waveforms when AC 230V is input in the synchronous rectification driving circuit 24 illustrated in FIG. 9 as the AC input voltage.

In the synchronous rectification driving circuit 22 illustrated in FIG. 7, it is assumed that a MOSFET having ON-resistance of 100 mΩ or less is used as the synchronous rectification switches SW1 and SW2. However, when the MOSFET having a low ON-resistance is used, the ON/OFF switching may be delayed while inputting a low voltage. Therefore, both the synchronous rectification switch SW1 and the synchronous rectification switch SW2 are simultaneously turned ON to generate a penetration current, and as a result, the switching loss may increase or the MOSFET may be broken.

In the synchronous rectification driving circuit 24 illustrated in FIG. 9, the penetration current may be prevented from being generated by discharging electric charges of the gate when the synchronous rectification switches SW1 and SW2 are turned OFF, by transistors Q1 and Q2 added prior to the gates of the synchronous rectification switches SW1 and SW2.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. A power supply device comprising:
   a first serial circuit coupled between a first output terminal and a second output terminal, and including a first switching element and a first rectification element;
   a second serial circuit coupled between the first output terminal and the second output terminal, and including a second switching element and a second rectification element;
   a first inductor inserted between a connection point between the first switching element and the first rectification element, and a first input terminal of an AC input;
   a second inductor inserted between a connection point between the second switching element and the second rectification element, and a second input terminal of the AC input;
   a third switching element inserted between a connection point between the first inductor and the first input terminal, and the second output terminal;
   a fourth switching element inserted between a connection point between the second inductor and the second input terminal, and the second output terminal;
   a control circuit configured to control the first and second switching elements; and
   a synchronous rectification control circuit configured to control the third and fourth switching elements.

2. The power supply device according to claim 1, wherein the synchronous rectification control circuit turns OFF the third switching element and turns ON the fourth switching element in the case of the AC input voltage, and turns ON the third switching element and turns OFF the fourth switching element when the AC input voltage is minus.

3. The power supply device according to claim 1, wherein the first and second switching elements are field-effect transistors.

4. The power supply device according to claim 3, wherein the third and fourth switching elements are field-effect transistors.

5. The power supply device according to claim 1, wherein the third and fourth switching elements have a lower ON-resistance than the first and second switching elements.

6. The power supply device according to claim 1, wherein the first and second switching elements are more rapidly switched than the third and fourth switching elements.

7. The power supply device according to claim 1, wherein the first and second switching elements are gallium nitride-high electron mobility transistors.

8. The power supply device according to claim 1, wherein the third and fourth switching elements are the gallium nitride-high electron mobility transistors.

* * * * *